United States Patent [19]
Renfroe

[11] 3,804,177
[45] Apr. 16, 1974

[54] FLOATING DRAG SCOOP

[75] Inventor: Walter D. Renfroe, Geneva, N.Y.

[73] Assignee: Terra Marine Scoop Company, Inc., Geneva, N.Y.

[22] Filed: July 26, 1972

[21] Appl. No.: 275,264

[52] U.S. Cl............. 172/26.5, 37/71, 37/115, 61/1 F, 114/61, 114/.5 F, 210/DIG. 21, 210/242
[51] Int. Cl............................................. F02f 5/28
[58] Field of Search............ 37/71, 54, 115; 114/61, 114/.5 F; 61/1 F; 210/DIG. 21, 242, 83; 172/26.5, 26.6

[56] References Cited
UNITED STATES PATENTS

| | | | |
|---|---|---|---|
| 3,010,231 | 11/1961 | Matelich | 37/54 |
| 3,084,309 | 4/1963 | Wiegardt, Jr. | 37/119 |
| 2,731,741 | 1/1956 | Kaufmann | 37/54 |
| 1,801,652 | 4/1931 | Alby | 37/71 X |
| 3,704,784 | 12/1972 | Craggs et al. | 210/242 |
| 3,268,081 | 8/1966 | Menkee et al. | 210/242 |
| 3,679,004 | 7/1972 | Loy | 37/71 X |
| 8,840 | 3/1852 | Hamilton | 37/71 X |
| 46,463 | 2/1865 | Gove | 37/71 X |

Primary Examiner—Ernest T. Wright, Jr.
Assistant Examiner—Clifford D. Crowder
Attorney, Agent, or Firm—Clarence A. O'Brien; Harvey B. Jacobson

[57] ABSTRACT

A floating drag scoop supported between two flotation type pontoons in which the scoop is of generally rectangular configuration provided with an open area in the front and bottom and a screened top so that the scoop may collect material from a body of water. The scoop or basket is supported from the pontoons by pivot means to enable the scoop or basket to be elevated to a vertical position with the scoop or basket also being oriented at a desired elevation in the body of water to permit the gathering or collecting of floating or suspended vegetation, debris, or similar material, and also the collecting of material from the bottom of a body of water, such as lakes, rivers, ponds, lagoons, and the like. The floating drag scoop is traversed forwards and backwards in relation to the body of water by the use of a truck mounted double drum winch and cables or other flexible members attached to the front and to the rear of the scoop and to the truck mounted winch with the cable being entrained over a sheave or snatch block connected to a deadman on the shore opposite to the truck.

14 Claims, 8 Drawing Figures

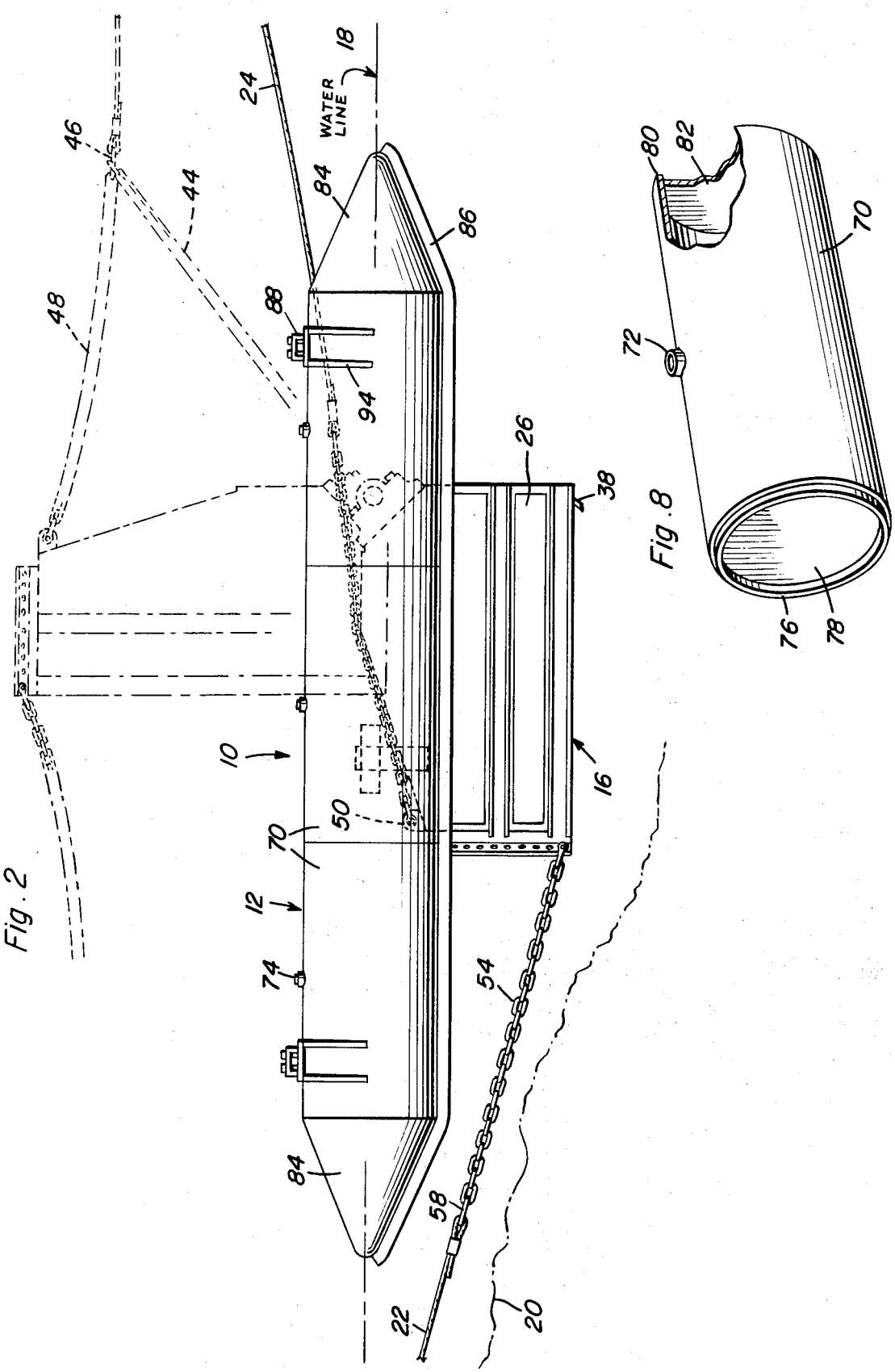

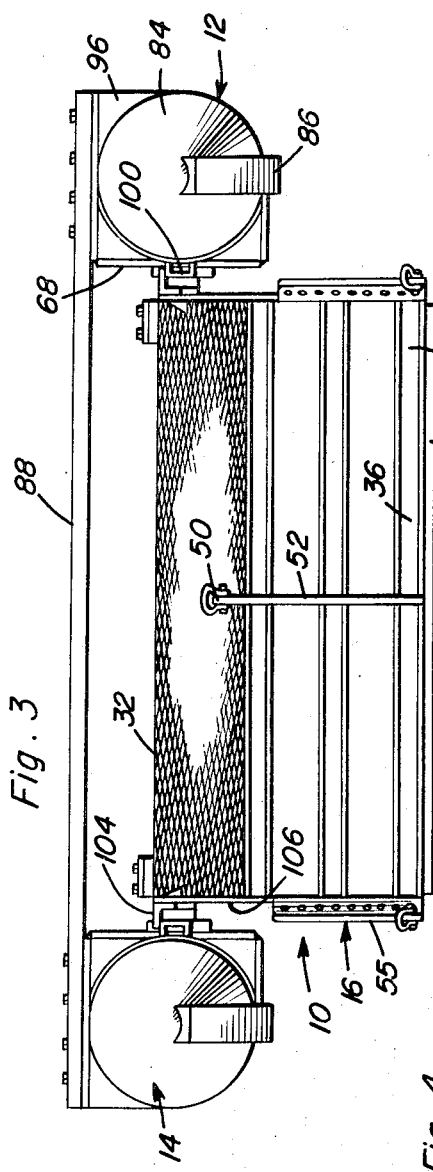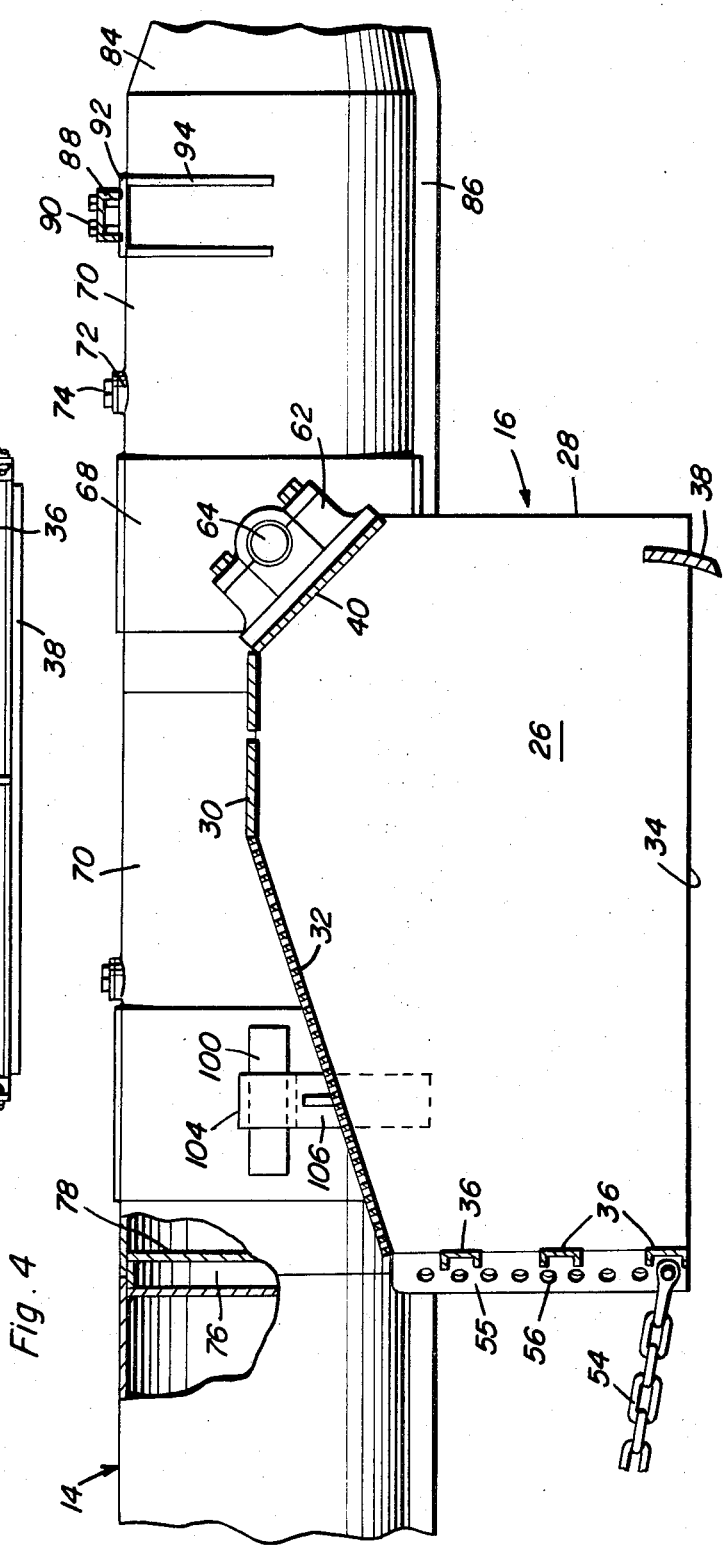

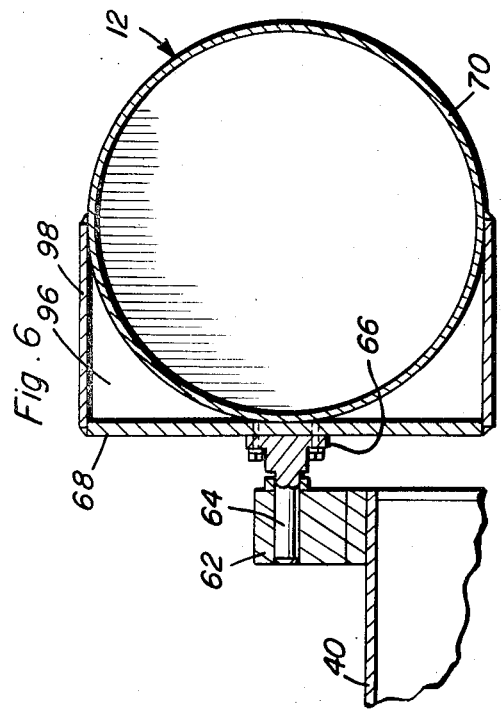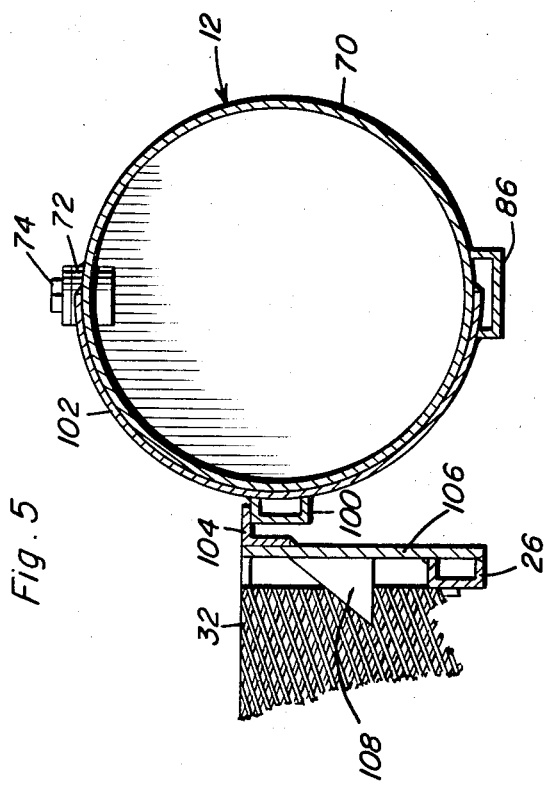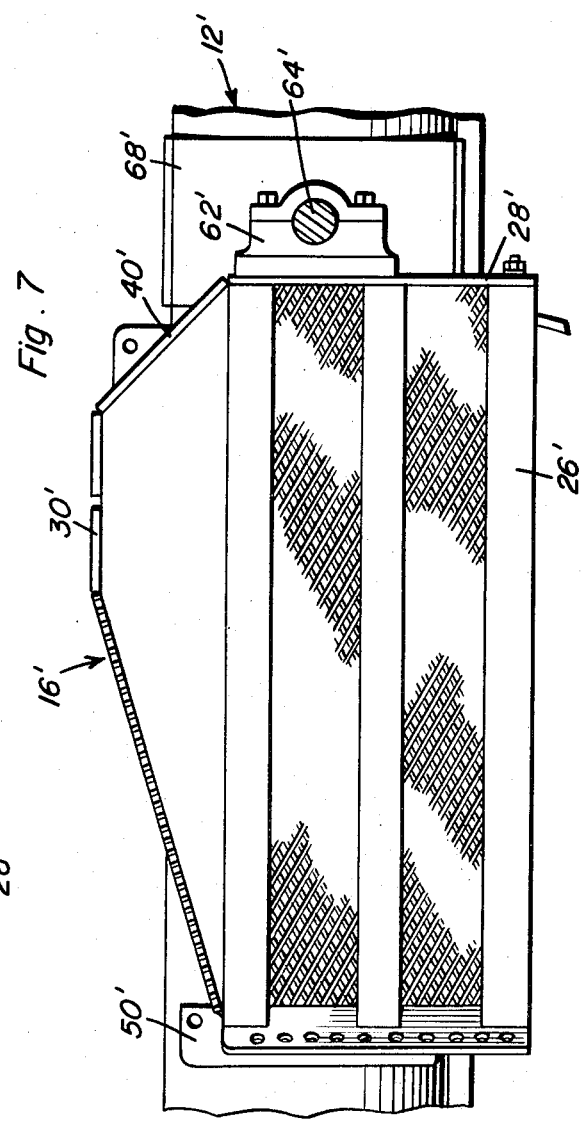

3,804,177

FLOATING DRAG SCOOP

BACKGROUND OF THE INVENTION

1. Field of the Invention

The present invention generally relates to a scoop or basket supported by pontoons with the scoop or basket being pulled in a forward or reverse manner in relation to the body of water for gathering floating debris, vegetation, or the like, suspended materials in the body of water or materials on the bottom of the body of water with such materials being carried to the shore and unloaded so that the scoop or basket may return in a vertical orientation for subsequent collecting operations.

2. Description of the Prior Art

Various devices have been provided for cleaning bodies of water. For example, in Schofield, U.S. Pat. No. 2,812,596, there is disclosed a scoop whcih can be traversed in relation to a body of water for removing mud from the bottom thereof. In my co-pending application. Ser. No. 183,854, filed Sept. 27, 1971, for Scoop, there is disclosed an improved scoop which can be traversed in a body of water for removing material from the bottom of the body of water. Additionally, Overstrom, U.S. Pat. No. 658,922, issued Oct. 2, 1900, discloses a submarine-type dredge that is primarily constructed for removing material from the bottom of a body of water. Lea, U.S. Pat. No. 722,595, issued Mar. 10, 1903, discloses a dredging machine in which a barge is used for flotation, but this dredging device is also constructed for removing material from the bottom of the body of water. Nelson, U.S. Pat. No. 963,168, issued July 5, 1910, relates to a flotation device but is primarily intended for raising sunken vessels to the surface of the water and is not concerned with dredging or removing material from a body of water. Powell, U.S. Pat. No. 1,691,738, issued Nov. 13, 1928, also discloses a salvage device having the primary purpose of salvaging sunken vessels from the bottom of a body of water. Thus, while the prior art devices are capable of removing mud or other polluting materials from the bottom of a body of water, none of them have the capabilities of removing material that may be growing or laying on or near the surface of the water in a body of water nor at the same time removing suspended material from the body of water and also capable of removing material from the bottom of the body of water with such material being conveyed to and dumped onto the shore of the body of water.

SUMMARY OF THE INVENTION

An object of the present invention is to provide a scoop or basket, depending upon the type of material to be removed, for removal of floating vegetation, debris, or the like, from the surface or near the surface or from the bottom of lakes, rivers, ponds, lagoons, harbors, and like bodies of water.

Another object of the invention is to provide a scoop or basket which includes a flotation device and a cable mechanism for enabling the scoop or basket to span larger bodies of water which cannot normally be reached by presently available equipment so that polluting materials may be brought to the shore where it can be removed for disposal.

A further object of the invention is to provide a scoop or basket in accordance with the preceding objects requiring a minimal amount of man power or work force.

The foregoing objects are obtained by providing a scoop or basket supported between two flotation type pontoons which will keep the scoop or basket on or near the surface of the body of water and which permits the scoop or basket to penetrate the water to a depth of several feet. However, by adding ballast to the pontoons, it is also feasible and practical to work to even greater depth, including the bottom surface of the body of water if the material requires such action. Also, the attitude of the scoop or basket is controlled by varying the tension applied to the pulling cables attached to the front of the scoop or basket or to the return cable which is attached to the top and rear of the scoop or basket, which will also change the position of the scoop or basket to a generally upright or vertical position which automatically unloads the material gathered as the scoop or basket is moved in a reverse direction.

The floating scoop is moved in a forward and reverse direction by use of a truck mounted double drum winch with cables attached to the front of the scoop or basket and to the top and rear of the scoop or basket. With the rear cable passing through a snatch block or sheave attached to a deadman either on the opposite shore or to a barge anchored off-shore, the scoop or basket can be brought to position off-shore or into the pond or body of water where additional material may be brought in. The cleaning cycle is accomplished by pulling the scoop or basket to shore loaded with material and then applying pressure to the rear cable so that the scoop or basket will be uprighted, thus unloading its load and the scoop or basket is then pulled back into the water for another load of material. By repeating this cycle, floating vegetation, debris, and like materials, can be removed from bodies of water that is not accessible by present day equipment. The specific construction of the truck mounted winch, cable assemblies and deadman are disclosed in my co-pending application which is incorporated herein by reference thereto. The scoop or basket may be used for various types of materials having different densities, such as floating materials, suspended materials, or the like, especially where a skimming action is desired as opposed to a digging action.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the construction of FIG. 1 illustrating the relationship of the scoop or basket in relation to the pontoons and the upright position of the basket during movement in a reverse direction.

FIG. 3 is a front elevational view of the floating drag scoop of this invention.

FIG. 4 is a longitudinal, vertical sectional view, on an enlarged scale, taken substantially upon a plane passing along section line 4—4 of FIG. 1 illustrating additional specific details of the connection between the scoop or basket and pontoons.

FIG. 5 is a transverse, sectional view taken substantially upon a plane passing along section line 5—5 of FIG. 1, on an enlarged scale, illustrating the structure of the pontoons and the supporting structure for the forward end of the scoop or basket.

FIG. 6 is a transverse, sectional view taken substantially upon a plane passing along section line 6—6 of FIG. 1, on an enlarged scale, illustrating the specific construction of the bearing block for the scoop and the manner in which it is supported from the pontoons.

FIG. 7 is a sectional view similar to FIG. 4 but illustrating a slightly modified arrangement of scoop and relationship to the pontoons.

FIG. 8 is a perspective view of one of the segments of the pontoons with portions thereof broken away illustrating the flotation characteristics therof.

DESCRIPTION OF THE PREFERRED EMBODIMENTS

Figure 1:
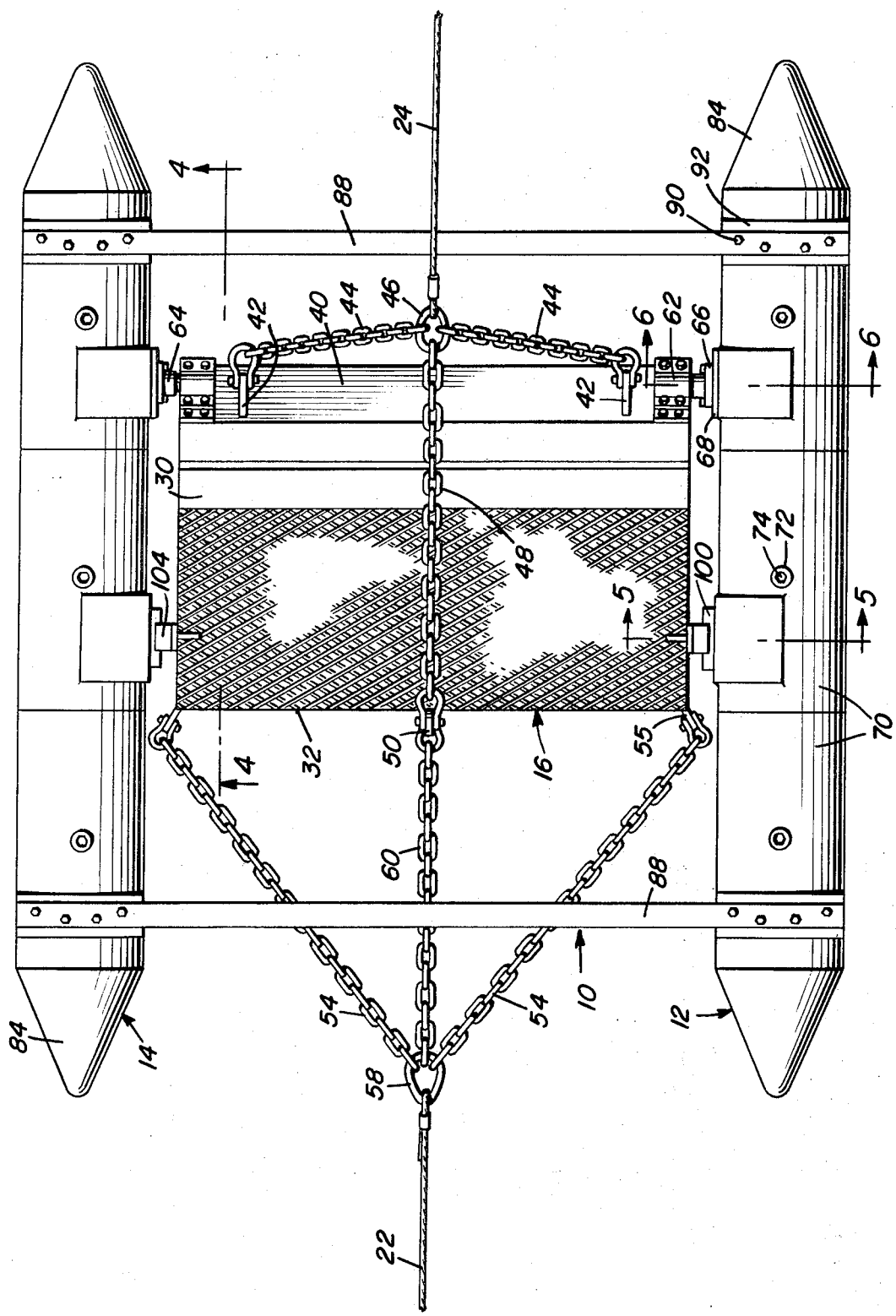
FIG. 1 is a top plan view of the floating drag scoop of the present invention illustrating the relationship of the scoop or basket and the pontoons.

Referring now specifically to the drawings, the floating drag scoop of the present invention is generally designated by reference numeral 10 and includes floating pontoons 12 and 14 spaced from each other and supporting a scoop or basket 16 therebetween with the pontoons 12 and 14 supporting the floating drag scoop 10 in a body of water 18 for collecting polluting materials from the body of water, such as floating vegetation, debris, suspended materials and materials which may be lying on the bottom of the body of water so that such materials may be collected and conveyed to the shore of the body of water or brought to the bottom surface of the body of water as designated by numeral 20 in FIG. 2 which is adjacent the shore line. The floating drag scoop 10 is connected to a pulling cable 22 at the forward end thereof and a reverse pulling cable 24 at the rearward end thereof with the cable 22 extending to a double drum winch mounted on a truck on the shore line and the reverse cable extending to a snatch block on a deadman or barge oriented on the opposite shore or at a remote off shore location with the cable 24 then returning to the double drum winch mounted on the truck. The particular structure for moving the floating drag scoop 10 is the same as that disclosed in my co-pending application Ser. No. 183,854, filed Sept. 27, 1971, for Scoop, which structure is incorporated herein by reference thereto. With this construction, the floating drag scoop 10 may be moved in a forward and reverse direction in relation to the body of water so that the floating drag scoop may traverse the body of water.

The scoop or basket 16 is also substantially the same as disclosed in my co-pending application Ser. No. 183,854 in that it includes sidewalls 26 interconnected by a rear wall 28 and a top wall 30 provided with an enlarged screen area 32. The bottom of the scoop is open as at 34 and the front of the scoop is provided with open areas but includes transversely extending members 36. A blade 38 is supported between the side walls 26 adjacent the bottom edge of the rear wall 28 in the same manner as disclosed in my co-pending application. Skids may or may not be employed along the bottom edges of the scoop or basket 16 and the top wall 30 includes an inclined member 40 having lugs 42 projecting upwardly therefrom adjacent each end for connecting with tension chains 44 that are interconnected by a ring 46 to which the cable 24 is attached. Also, a forwardly extending chain 48 is attached to the ring and extends to and is attached to a center lug 50 on the front top portion of the basket which is connected to an upstanding plate or bracket 52. Forwardly extending converging chains 54 are attached to diverging wing plates 55 on the forward ends of the scoop with the wing plates 55 having vertical apertures 56 therein to enable vertical adjustment of the point of attachment of the chains 54. The chains 54 are interconnected by a ring 58 at the forward end thereof and a center chain 60 extends between the ring 58 and a ring below the lug 50 on the upper end of the center plate 52 with chains 54 and 60 lying in the same plane with this structure being substantially the same as that disclosed in my co-pending application and the operation thereof being substantially the same inasmuch as when tension is exerted on the cable 24 and thus unto chain 48 through ring 46 and released on the cable 22, the scoop or basket 16 will assume or move toward a vertical or upright position illustrated in broken lines in FIG. 2.

The inclined member 40 is provided with a split bearing block or pillow block 62 adjacent each end thereof with the bearing block 62 being rigidly affixed to the member 40 in any suitable manner and including a removable cap to enable a pivot pin or stub shaft 64 to be removed from and positioned in the bearing block 62. The pivot pin or stub shaft 64 includes a mounting flange 66 that is rigidly fixed to a vertical plate 68 that is fixed rigidly with a pontoon 12 or 14 as the case may be with the bearing block and related assembly being duplicated on each side of the scoop or basket 16.

Each of the pontoons 12 and 14 includes a plurality of cylindrical tubular members 70, as illustrated in FIG. 8, with each tubular member having a threaded opening 72 therein closed by a closure plug or cap 74. One end of each tubular member 70 is provided with a projecting flange 67 extending outwardly from an end wall 78 thereof and the other end of each tubular member is provided with a similar flange 80 projecting outwardly from the end wall 82 thereof. As illustrated, the flange 76 is slightly smaller in diameter than the flange 80 so that the tubular members 70 may be partly telescoped in relation to each other when assembled. Each end of each pontoon is provided with a tapered hollow member or tubular member 84 to provide a pontoon having tapered ends. Along the bottom edge of each of the pontoons 12 and 14 is an elongated skid or rib 86 which may be in the form of a channel-shaped member welded to the tubular members which serves to assemble the tubular members into a rigid pontoon with the skid 86 also serving to slidingly support the pontoons when they engage the bottom surface of the body of water or the adjacent shore to enable movement of the pontoons thereon.

The pontoons 12 and 14 are interconnected by elongated substantially parallel connecting members 88 adjacent the front and rear of the pontoons, respectively, with the connecting members 88 being of channel-shaped configuration or any other suitable shape and secured to the pontoons by bolt-type fasteners 90, or the like. The transverse connecting members 88 are attached to horizontally disposed plates 92 across the top of the cylindrical pontoons with the plates 92 being fixedly attached to the pontoons by gusset-type filler plates 94. A similar arrangement is provided for attaching the vertical plates 68 to the pontoons with gusset plates 96 being provided which are vertically oriented and in this instance, the edges of the gusset plates 96 are interconnected by connector plates 98 which serve to reinforce the vertical plates 68 which have the pivot pin or stub shaft 64 attached thereby providing additional strength and rigidity at the attachment points for the scoop or basket 16. All of the structure is of metallic construction and may be welded, bolted, riveted, or otherwise secured by employing conventional and accepted techniques.

Thus, with this construction, the two pontoons 12 and 14 are rigidly interconnected and retained in substantially parallel relationship and the flotation level of the pontoons may be varied by removing a plug 74 or removing several plugs 74 and adding ballast thereto which may be in the form of water. Thus, not only the over-all flotation characteristics can be determined, but also the attitude of the pontoons may be determined by adding or removing ballast to selected tubular members. With this arrangement, the pontoons may be floated at the water surface or in various relations thereto or may be sunk for movement along the bottom surface of the body of water. The scoop or basket 16 is attached between the pontoons by the pivot pin 64 being received in the bearing pillow blocks 62 for pivotal movement of the scoop or basket 16 about a transverse axis from a substantially horizontal position to a substantially vertical or upright position although the angular orientation of the scoop or basket 16 may be varied in relation to the pontoons by the tension applied to the cables 22 and 24, respectively, with a limit being provided for the downward swinging movement of the forward end of the scoop or basket 16 with the limit means including a stop member 100 attached to each of the pontoons 12 and 14 at the inner edge thereof. The stop member 100 may be in the form of a channel-shaped member secured to a semi-cylindrical attaching plate 102 that may be secured to the surface of the pontoon 12 or 14 by welding, or the like, thus forming a limit for engagement by a laterally extending lug 104 that is rigidly fixed to the side wall 26 of the scoop or basket 16 adjacent the upper edge thereof. Thus, the engagement of the lug 104 with the stop 100 limits downward swinging movement of the forward end of the scoop or basket 16 so that the bottom edge of the scoop or basket generally parallels the longitudinal attitude of the pontoons 12 and 14.

As illustrated in FIG. 5, the lug 104 is attached to a bracket 106 that projects above the top edge of the side wall 26 which does slope downwardly to correspond with the screened area 32 of the top of the scoop or basket. Reinforcing gusset plates 108 may be provided for the bracket 106 thus rigidifying the structure.

FIG. 7 illustrates a modified form of scoop or basket 16' associated with the pontoons in a slightly different manner with the bearing blocks 62' being disposed on the rear wall 28' rather than on the inclined top wall member 40'. The pivot pins or stub shaft 64' are oriented in the same manner to the pontoons. In this arrangement, the side walls 26' may also be provided with screen mesh inserts, if desired. This device works in the same manner as in the embodiment illustrated in FIGS. 1–6 except that the scoop or basket may have greater capacity. For example, the scoop or basket 16 illustrated in FIGS. 1–6 may have a capacity of 3 cubic yards, whereas the scoop or basket 16' illustrated in FIG. 7 may have a capacity of 5 cubic yards, although the capacity of the scoops may vary depending upon the requirements anticipated.

The scoop or basket may be employed for removing growing vegetation on or adjacent the surface of the water, floating vegetation or debirs on or near the surface of the water and also remove material at any depth in the water. The elevation of the scoop may be varied by altering the attitude of the pontoons by adding or removing ballast at any desired location thereon and the attitude of the scoop or basket may also be altered by varying the tension applied to the cables 22 and 24 with the scoop actually being capable of positioning in any attitude between its lowermost position where the lug 104 hits the stop 100 to its upright position in which position it is completely unloaded. The material collected by the scoop or basket may be deposited on shore by pulling the assembly onto the shore and then reversing the scoop which cause the scoop to tilt to the upright position for unloading thereof. The device may be used for removing material from various bodies of water including harbors, beach areas, and the like, by anchoring the snatch block for the reverse cable 24 to any off shore anchoring device. The scoop can be used for materials having substantial density yet floating or it could be used for light material where a skimming action is desired with the characteristics of the walls of the scoop being variable as to the flowthrough of water so that the device will act as a scoop or basket.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. An apparatus for removing polluting materials from a body of water, including material which may be on the bottom of the body of water as well as material floating or suspended in the body of water, comprising a drag scoop adapted to be moved in traversing relation to the body of water, and flotation means engaged with said scoop for supporting the drag scoop in desired relation to the body of water, said scoop having an open area for collecting material from the body of water as the scoop is moved in traversing relation thereto, said flotation means including a pair of pontoons stabilized in substantially spaced parallel relation, said scoop being supported between the pontoons with the scoop including a bottom portion depending below the pontoons, each of said pontoons including an attaching bracket having a stub shaft rigid thereon, said stud shaft extending inwardly from the pontoons, said scoop including bearing means rotatably receiving said stud shafts thereby pivotally supporting the scoop from the pontoons, said bearing means on the scoop being disposed adjacent the rear thereof, means on each of said pontoons forwardly of the stub shaft forming a stop means for engagement by the forward end portion of the scoop to limit downward swinging movement of the forward end of the scoop in relation to the pontoons.

2. The structure as defined in claim 1 wherein said scoop includes a laterally extending lug at each side thereof adjacent the front edge thereof for engaging the stop means on the pontoons for limiting the downward swinging movement of the forward end of the scoop.

3. The structure as defined in claim 2 wherein each of said pontoons includes a plurality of hollow tubular members, each tubular member including a closure plug to enable ballast to be placed into or removed from the tubular member for varying the flotation attitude of each of the pontoons.

4. The structure as defined in claim 3 wherein said tubular members are interconnected by an elongated member rigid with the bottom thereof forming a skid for the pontoons, each pontoon including a tapered end member with the skid extending upwardly around the tapered end portions of each pontoon thereby forming a skid for the pontoons when engaging the bottom of a body of water or the shore thereof.

5. The structure as defined in claim 4 wherein said tubular members include telescopic end portions to facilitate assembly thereof thereby enabling the length of the pontoon to be varied by varying the number of tubular members assembled.

6. The structure as defined in claim 1 wherein said scoop includes an open bottom area and an open area in the front with the top of the scoop including a screen portion and a transverse blade across the bottom of the scoop adjacent the rear thereof.

7. The structure as defined in claim 1 wherein each of said pontoons includes means enabling the flotation characteristics thereof to be varied by adding or removing ballast.

8. The structure as defined in claim 7 wherein each of said pontoons includes a plurality of independent tubular members, said means enabling variation of the flotation characteristics thereof including openings in each of the tubular members having a removable closure to enable water or similar ballast to be placed into and removed from the individual tubular members to enable the flotation characteristics and attitudinal characteristics of each pontoon to be varied.

9. The structure as defined in claim 8 wherein each of said tubular members is of cylindrical configuration, means on the ends of the tubular members for retaining them in aligned assembled relation, each pontoon including a tapered tubular member at each end thereof, and means extending under and interconnecting all of the tubular members.

10. The structure as defined in claim 9 wherein said means extending under the tubular members includes a rigid skid fixedly secured to each of the tubular members.

11. The structure as defined in claim 1 together with means interconnecting the pontoons including a pair of transversely extending rigid members spaced longitudinally from each other for enabling upward swinging movement of the scoop from a normally horizontal position to an upright position for unloading when the apparatus is pulled forwardly onto the shore and then pulled in reverse direction by tension members connected with the scoop.

12. An apparatus for removing polluting materials from a body of water, including material which may be on the bottom of the body of water as well as material floating or suspended in the body of water, comprising a scoop adapted to be moved in traversing relation to the body of water, and flotation means supporting the scoop in desired relation to the body of water, said scoop having an open area for collecting material from the body of water as the scoop is moved in traversing relation thereto, and means supporting the scoop from the flotation means for movement of the scoop automatically between a position for collecting pollutants in response to a towing force applied to the scoop in a forward direction and a position for discharging pollutants therefrom in response to a towing force applied to the scoop in a reverse direction, said flotation means including a pair of spaced, substantially parallel pontoons, said scoop being disposed between the pontoons, said means supporting the scoop from the flotation means for movement between collecting and discharging positions including means pivotally supporting the rear portion of the scoop from the pontoons for pivotal movement about a transverse axis, and stop means on the flotation means limiting pivotal movement of the scoop in relation to the pontoons.

13. An apparatus for removing polluting materials from a body of water, including material which may be on the bottom of the body of water as well as material floating or suspended in the body of water, comprising a scoop adapted to be moved in traversing relation to the body of water, and flotation means supporting the scoop in desired relation to the body of water, said scoop having an open area for collecting material from the body of water as the scoop is moved in traversing relation thereto, and means supporting the scoop from the flotation means for movement of the scoop automatically between a position for collecting pollutants when towing force is applied to the scoop whereby the apparatus is pulled in a forward direction and a position for discharging pollutants therefrom when pulled in a reverse direction, said flotation means including a pair of spaced, substantially parallel pontoons, said scoop being disposed between the pontoons, said means supporting the scoop from the flotation means including means pivotally supporting the rear portion of the scoop from the pontoons for pivotal movement about a transverse axis, and means limiting pivotal movement of the scoop in relation to the pontoons, said limiting means including stop means rigid with the pontoons in forwardly spaced relation to the transverse axis, and means on the scoop engageable with the stop means for limiting the downward pivotal movement of the forward portion of the scoop to substantially a horizontal position.

14. The structure as defined in claim 13 wherein said scoop includes an open bottom area oriented below the pontoons when in horizontal position, and towing means connected with the scoop to tow the apparatus and cause pivoting of the scoop to substantially upright discharging position when towed rearwardly.

* * * * *